United States Patent [19]

Ogura et al.

[11] 4,063,304
[45] Dec. 13, 1977

[54] METHOD OF CONTROLLING THE ROTATION OF A ROTARY BODY AND APPARATUS THEREOF

[76] Inventors: Junshiro Ogura, No. 25-6, Kita 4-chome; Toshio Niimi, No. 1-1, Kita 5-chome, both of Omori Ota, Tokyo, Japan

[21] Appl. No.: 660,026

[22] Filed: Feb. 20, 1976

[30] Foreign Application Priority Data

| Feb. 26, 1975 | Japan | 50-22792 |
| Mar. 13, 1975 | Japan | 50-30482 |
| Mar. 27, 1975 | Japan | 50-37301 |

[51] Int. Cl.² ............................................. G05D 13/62
[52] U.S. Cl. ................................................... 361/242
[58] Field of Search ...................... 317/5; 318/82, 84; 361/236, 239, 240, 242

[56] References Cited

U.S. PATENT DOCUMENTS 3,983,954   10/1976   Noddings et al. .................. 317/5 X Primary Examiner—A. D. Pellinen

[57] ABSTRACT

Method and apparatus of controlling the revolving speed of a rotary body to be rotated at the predetermined number of revolution corresponding to the reference or first signal $F_1$. The rotary body equipped with an alternating current generator which generates a frequency signal or third signal $F_3$ in proportion to the number of revolution thereof. During operation, the signal $F_3$ being compared with the signal $F_1$, if the deviation of the signal $F_3$ from the signal $F_1$ is within tolerance, a second variable signal $F_2$ is swept to coincide the same with the signal $F_3$ and further to coincide with the first signal $F_1$ while maintaining the coincidence of the second and third signals thereby to resume the number of revolution of the rotary body to that corresponding to the reference signal.

6 Claims, 5 Drawing Figures

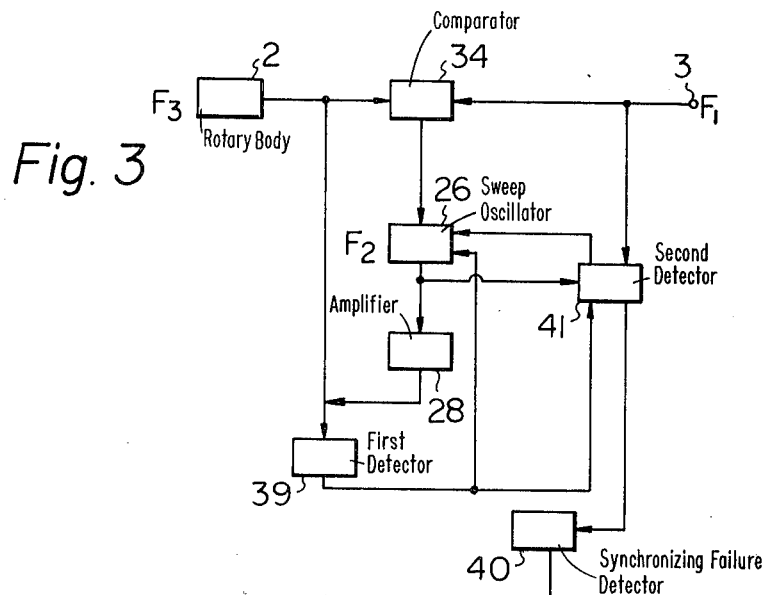
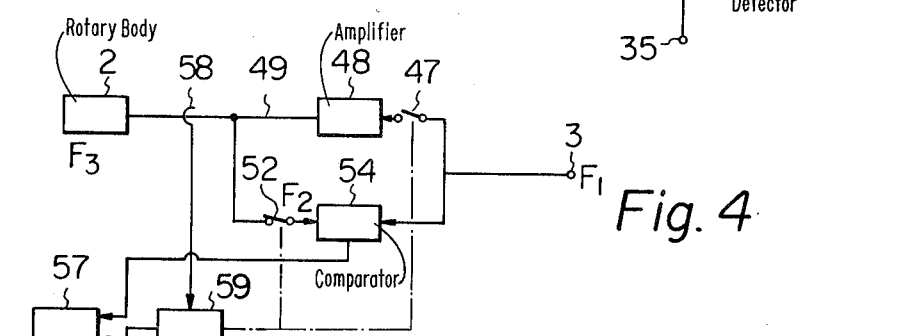
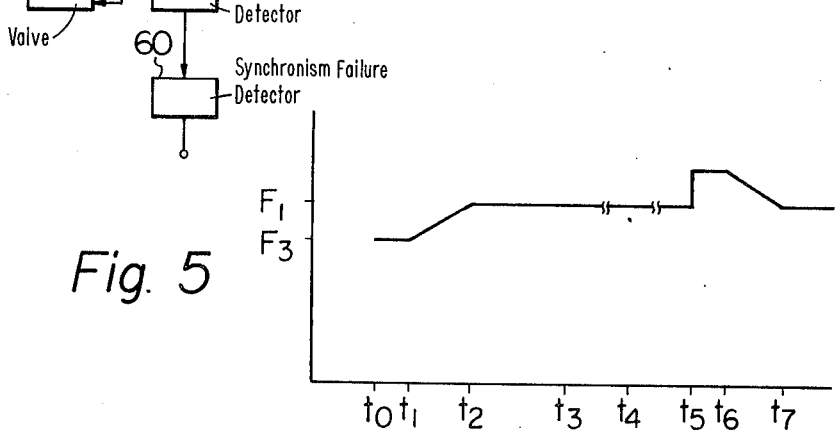

METHOD OF CONTROLLING THE ROTATION OF A ROTARY BODY AND APPARATUS THEREOF

BACKGROUND OF THE INVENTION

This invention relates to a control of a rotary body, and is particulary concerned with a method of controlling the speed of rotation of the rotary body of a false-twister and apparatus thereof.

In a typical process of crimping synthetic fibre yarn, a rotatable body, which is a false-twister spindle, running at high speed, twists the yarn fed from supply bobbin and heated previously for the purpose. The twisted yarn is untwisted after leaving said rotary body and then taken up onto a bobbin. The main driving means for the rotary body may comprise an air turbine. The rotary body may be tubular and carry a rotor of an air turbine.

As the feeding and take up movement is driven independently of the twisting movement, without interrelation between each other, it is obvious that twist irregularity becomes unavoidable in case when the twisting speed is uneven, causing dyeing speck thereby. On the other hand, the speed up of the processing has become urgent in order to raise the efficiency of the production. It has become inevitable to keep the speed of the twisting spindle constant, as well as the speed of winding the yarn. Hereby, it is needed to devise means to control and stabilize the speed of rotation of the spindle, or means to make the speed resume its predetermined speed as quick as possible so far as the deviation of the speed lies within a certain tolerance.

Hitherto, the control of the rotating speed has been attempted by detecting the speed of the rotary body either continuously or intermittently, then comparing it with a reference value of speed, in case when the amount of deviation exceeds a fixed limit, the deviation value is simply fed back to the power control system of the drive. This method effects no control of speed when the deviation lies within the limited range fixed for such scheme of control.

Meanwhile, as the yarn is fed to the twister at a speed independent of the revolving speed of the twister, the gradual fluctuation of the latter may unavoidably cause twist irregularity of the yarn.

As such controlling procedure starts only after detecting the deviation of the rotary body from a fixed tolerance, it is natural that the starting of the controlling procedure can not occur before the fluctuation of speed has deviated out of the fixed tolerance to a certain amount, and the yarn is left running without remedy for the twist irregularity all the while.

Moreover, when the speed fluctuates over a minute duration of time and is restored automatically to its original speed after that, the recovery procedure will take the more time, the larger the amount of deviation, because of the moment of inertia of the rotating body, and because the transitional loading on the system will disturb the quick response of the system. This will be a cause of the twist irregularity appearing in spots or in a wave form distribution, lowering merchandise value thereof by the degradation.

So far as the speed of the rotary body is limited within a certain low value, the speed control may be accomplished by controlling the opening of the air supply valve to the turbine, or by changing the angle of injection of the air jet thereto, but, at present days, the revolving speed of the rotating body has reached 500,000 rpm, in some case more than 1,000,000 rpm. In such cases, the speed of the rotating body can hardly be controlled instantaneously through conventional means as by controlling the valve opening or by changing the direction of inclination of air jet to the turbine.

The output signal of a rotary body is, generally, picked up as one of electric quantities proportional to the speed of the body.

When the revolution of the controlled system restores the predetermined revolution through actuating the control system on the basis of the comparison of the speed signal of the rotary body with the standard or reference signal, a time lag is inevitable due to the feedback of the information. On the other hand, although the information is electrically transmitted to the control system, the time lag occurs while restoring the revolution of the controlled system within the predetermined tolerance because of the mechanical actuation in the actuator.

It means the inability of the system to restore the rotating speed to the fixed speed in instantaneous response to the fluctuation of the speed of the rotating body. Moreover, as the nature of the speed comparator in a control system, it starts sending the deviation signal or information to the speed regulator only when the amount of fluctuation deviated from the fixed limit of tolerance, a minute fluctuation of speed within the tolerance limit can not cause any compensating control of the system.

SUMMARY OF THE INVENTION

This invention overcomes the defects mentioned above. By this system, deviation of rotating speed within a tolerance, through some cause either internal or external, is restored to the predetermined speed quickly, and once the speed attained the reference value, it is forced to maintain the predetermined speed of the rotating body.

It is also possible to break the yarn or to give alarm in case when the speed deviate from the tolerance limit either transitional or not. Therefore the object of the present invention is to provide a a method and an apparatus for control of a rotary body in which the revolving speed of the rotary body is pulled into coincidence with a predetermined speed corresponding to the reference speed signal and the coincidence therebetween is secured positively with a holding power sufficient to maintain coincidence withstanding possible disturbances.

For accomplishing the above object, it is provided with a method of controlling the speed of a rotary body rotatable by a mechanical drive, the speed of which being effected to maintain a preset number of revolution by a variable second electric signal which can coincide with a first electric signal corresponding to a preset number of revolution, said method comprising the steps of making a comparison of said first signal with a third electric signal being generated by the revolution of said rotary body when the number of revolution of said rotary body deviates from the number of revolution corresponding to said second signal, sweeping the second signal to coincide the same with said third signal when the deviation based on said comparison lies within tolerance, and further sweeping said second signal to coincide the same with said first signal and to fix thereto, while maintaining the coincidence of said second signal with said third signal.

For achievement of the above-mentioned method, it is provided with an apparatus for controlling the speed of a rotary body rotatable around the axis thereof through a mechanical drive, the rotation thereof being capable of maintaining through electric signal, comprising a comparator to compare a first set signal with a third signal being generated from said rotary body, a signal generator for supplying a variable or second signal to said rotary body, and sweeping means for sweeping the output signal of the signal generator based on the deviation between said first and third signals detected by said comparator when said deviation is within tolerance, said apparatus further comprising means for fixing said second signal to said first signal when said second signal coincides with said first signal while continuing the coincidence of the second signal with the third signal after the coincidence of the second signal with the first signal.

Preferred embodiments of this invention will now be described with reference to the accompanying drawings.

BRIEF DESCRIPTION OF THE DRAWINGS

FIG. 3 shows a block diagram of another embodiment of this invention.

FIG. 4 is an additional embodiment of this invention expressed in a block diagram.

FIG. 5 is a diagrammatic expression of the variation in frequency during the controlling course by the scheme shown in FIG. 4.

DESCRIPTION OF THE PREFERRED EMBODIMENTS

Referring to drawings, the explanation of embodiments of this invention will be given, in which the frequency is adopted as the media of the controlling performances.

Figure 1:
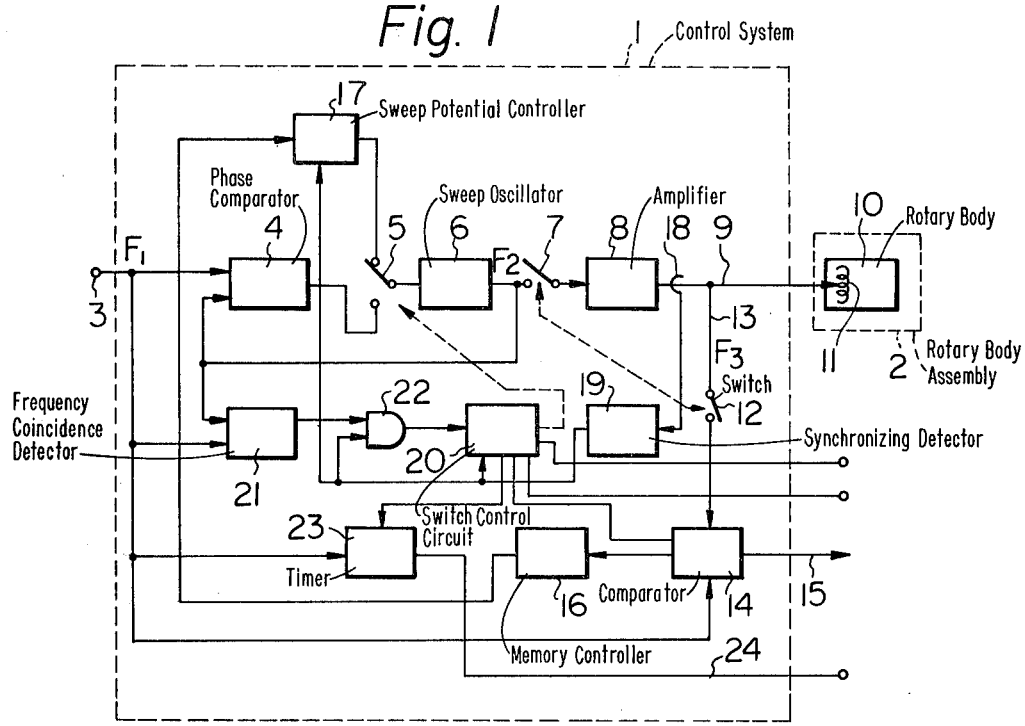
FIG. 1 is a concrete example of this invention expressed in a block diagram.

In FIG. 1. the portion 1 bordered by broken line represents a control system and the portion 2, to the right, also surrounded by broken line, represents a rotary body assembly.

The rotary body assembly comprises a tubular body 10 and a pair of stationary electromagnetic poles prepared for imparting the body the second driving power. Said tubular body may be supported in a pair of bearings (preferably air bearings) and carrying, as a part thereof, an impeller of an air turbine to which air jet may be directed causing it to turn.

The tubular body also comprises, as a part thereof, a permanent magnet, having diametrical N.S. magnetic poles, which is located between the poles of said stationary electromagnet, making both flux interlink with each other.

The power to the stationary electromagnet is supplied through the sweep oscillator 6 to be mentioned later, in a form of an alternating current, namely, a second signal $F_2$ to the coil of the magnet after amplified by the amplifier 8.

By this power supply, the rotary body 10 becomes a synchronous machine revolving in synchronizing with the signal frequency generated by the oscillator 6. This synchronous machine generates in the coil 11 when it revolves, a frequency signal the frequency of which is proportional to the speed of revolution, namely, the third signal $F_3$. Consequently, the synchronous machine is at the same time a synchronous motor as well as an alternating current generator.

So far as the rotary body is running at the preset speed of revolution, it maintains said speed through the signal $F_2$ applied thereto as the output of the oscillator 6, just corresponding to the reference signal $F_1$. Further regarding the case when, by some cause, the speed of the rotary body gets to deviate from the preset value of the revolutional speed, the behavior of the signal $F_3$ generated at time of $t_0$ to $t_1$ will now be scrutinized.

Figure 2:
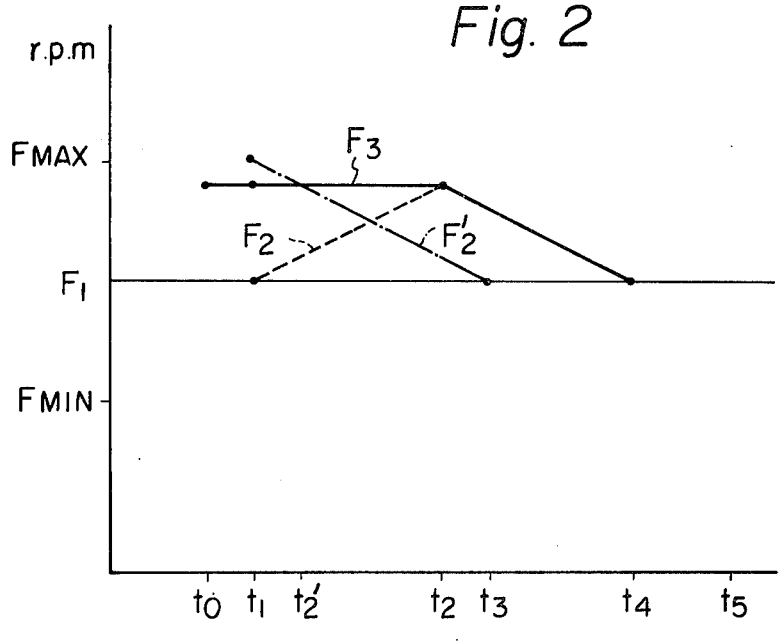
FIG. 2 is a diagrammatic expression of variation in frequency in the course of controlling the speed.

In this case, the signal $F_3$ which varies in proportion to the actual revolving speed of the rotary body is sent to a comparator 14, wherein the third signal is compared with the signal $F_1$ corresponding to the predetermined speed, detecting whether the amount of the deviation lies between the tolerance limits, namely between Fmax and Fmin (see FIG. 2) and, whether the deviation of the third signal $F_3$ from the first or reference signal $F_1$ is positive or negative.

A switch 12 on the line 13 is a change over switch to interlock with the switch 7 placed between the oscillator 6 and an amplifier 8, and is actuated through the synchronism detector 19. The switch 12 is so arranged that it is closed during the period when the third signal $F_3$ runs through line 13, which may be accomplished by ordinary technique. At the $t_1$, of which, the timing $t_0 - t_1$ is preset in the comparator 14, the switches 7 and 12 are changed over making the switch 7 and breaking the switch 12, controlled by the detector 19 through the signal sent to it by the comparator 14, and the output signal from the sweep oscillator 6 is amplified by the amplifier 8 and is fed to coil 11 through the line 9. Again, at the time of $t_1$, when the comparator 14 completes the discrimination of the deviation of the third signal $F_3$, and it is detected that the signal $F_3$ went beyond the tolerance limit, the comparator 14 is able to send out yarn breaking signal or failure alarm through the line 15.

On the other hand, when the signal $F_3$ is detected to lie within said limits, between Fmax and Fmin, the indication from the comparator 14 will cause the memory controller 16 to send a signal to a sweep voltage controller 17, carrying the value and direction of said deviation of the signal $F_3$. From the aforementioned, it follows that the controller is used to determine the direction and amplitude of the sweeping voltage of the oscillator 6.

The sweep voltage controller 17 functions to determine the sweep speed and sweep range of the oscillator 6 through the signal from the momory controller 16, and the sweep oscillator 6 is a generator for sweeping an output signal in accordance with the output from the sweep voltage controller 17.

In case when the third signal $F_3$ is of higher frequency than that of the first signal $F_1$, being the sense of the deviation positive, the second signal $F_2$ generated by the sweep oscillator 6 will be swept to positive or increasing direction by the function of the sweep potential controller 17.

After the time of $t_1$, the coil 11 is supplied with the amplified output of the second signal $F_2$, and produces an electromagnetic field through the current of the second frequency $F_2$. In this case, as the energy of $F_2$ is far larger than that of the third signal $F_3$, it is enough to impart the rotary body, which is is driven by main driving means, an electric energy with the frequency $F_2$.

As the sweeping goes on, the frequency $F_3$ coincides with the frequency $F_2$ at the time of $t_2$ in synchronizing with each other. The coincidence is detected by the synchronizing detector 19 through the coupling 18. Then the detection signal actuates the sweep voltage controller 17 and causes the sweep oscillator 6 to begin sweeping towards the direction which makes it approach the first signal $F_1$. Meanwhile, the rotary body runs in synchronizing with $F_2$ since the time step $t_2$. It is also possible to get the oscillator 6 start its sweep movement from an allowable limitative value Fmax, in which case the sweep signal may be denoted as $F_2'$, and the rotary body synchronizes with it at the time of $t_2'$. On the other hand, the second signal $F_2$ is sent to the frequency coincidence detector 21, and, when it coincides with the first signal $F_1$, the signal output from the coincidence detector 21 is sent to an "AND" logic circuit 22, together with the coincidence signal of $F_2$ with the actual speed signal $F_3$ of the rotary body. The "AND" logic output is then sent to the switch control circuit 20.

When the switch 5 is turned over to connect the oscillator 6 with a phase comparator 4, the frequency-servo consisting of the phase comparator 4, the sweep oscillator 6, and the "make" contact 5 will function to keep the second signal $F_2$ generated by the oscillator 6 in synchronizing with the fixed basic signal $F_1$, after the time of $t_4$.

Accordingly, the third signal $F_3$ corresponding to the speed of the rotary body, which is already synchronized with the signal $F_2$, is fixed to the signal $F_1$, and the rotary body will keep running at high speed just set for the control.

The function of the frequency-servo will now be explained. In this case, the switch 5 is closed to complete the circuit including the lower contact in FIG. 1 and the first signal $F_1$ is lead to the phase comparator 4 and then to the sweep oscillator 6 via contact 5. The oscillator 6 has a low-passfilter and D.C. amplifier if required. The comparator 4 and oscillator 6 compose a closed loop circuit which effects to make the difference of frequencies between $F_1$ and $F_2$ to zero. The resultant signal, which is synchronized with the signal $F_1$, is amplified in the amplifier 8 via contact 7, and is lead to the coil 11 in the rotary body assembly 2 via line 9.

In case when the synchronizing control operation fails to complete at the time of $t_5$, the synchronizing indication from the synchronism detector 19 fails to reach the switch control circuit 20, then any control signal to stop the timer is not given from the circuit 20. Accordingly, the timer 23 continues to move and at the time of $t_5$, a signal, reporting inability of synchronism will be issued therefrom via the line 24. When the rotary body 10 misses synchronization by some cause such as the breakage of yarn, the disorder of the revolution is detected by the synchronism detector 19. The third signal $F_3$ is sent to the comparator through the lines 9 and 13, from the time of $t_0$, during the period $t_0 - t_1$, and the similar sequence as mentioned hitherto takes place, leading to the restoration of synchronization. Practical design of each block of the circuit and function thereof will easily be designed by one skilled in the art without inventive conception. Again, relating to the rotary body 10, as the scheme of giving a signal to accomplish a preferrable regulation of air supply to the turbine, following the condition of synchronization, may be accomplished without requiring inventive effort, the details are omitted from the present explanation.

An alternative embodiment of this invention is illustrated in FIG. 3, in which, corresponding elements bear numbers larger by "20" than those in FIG. 1. In FIG. 3, a comparator 34 receives one of its input signals, the standard basic speed signal $F_1$ from source 3 and the other input signal $F_3$, the present speed signal from the rotary body 2 and detects the deviation between the signals $F_1$ and $F_3$.

As the result of comparison, the detection signal from the comparator is sent to a sweep oscillator 26 which generates an oscillation signal $F_2$. Said detection signal determines to sweep the oscillation signal $F_2$ of the oscillator whether the signal $F_2$ is to be increased or decreased by the value sent from the comparator 34. The signal $F_2$ is started from within the set range $F_1 35$ $\Delta F$ i.e. between $F_{max}$ and $F_{min}$ in relation to the predetermined reference input frequency $F_1$ and swept by the predetermined sweep rate. In the course of sweeping of the frequency $F_2$, at the moment when the signal $F_3$ generated proportionally to the speed of the rotary body, comes to coincidence with the signal $F_2$, both frequencies get in synchronism, and the frequency $F_3$ is synchronized with the signal $F_2$ thereafter. This is to be called the first coincidence, and the rotary body runs according to the frequency $F_2$. That means, the power of the signal $F_2$, which is amplified previously, overwhelms the frequency $F_3$, causing the rotary body 2 to be pulled in synchronization with the frequency $F_2$. This coincidence of both frequencies $F_3$ and $F_2$ is detected by the first detector 39, the output from which is sent to the oscillator 26, making it start sweeping to the direction which makes the frequency $F_2$ approach the frequency $F_1$.

As the result, when the frequency $F_2$ coincides with the frequency $F_1$ getting into so-called the second coincidence, the information is sent to a second detector 41, together with the information of the first coincidence mentioned above. Then the second detector 41 generates a signal to make the oscillator 26 fix the frequency $F_2$ at that value. As mention above, since the ouput frequency $F_2$ of the oscillator is fixed within a predetermined range and being amplified and supplied with energy larger than that of the frequency $F_3$ to the rotary body, the rotary body keeps running at a speed synchronized with the frequency $F_2$.

When, by some cause, the synchronization gets broken, the first detector 39 ceases to send the first coincidence signal to the oscillator 26 and to the second detector 41. Then the amplifier 28 stops to transmit the amplified second signal $F_2$ to the rotary body. At the same time, the comparator 34 starts comparing the signal $F_3$ with the signal $F_1$ for the predetermined duration for the comparison. The function is, that is to say, to set out of repeating the controlling cycle mentioned hitherto. A synchronizing failure detector 40 includes timer clock means and, in the case when said synchronizing control is not completed within a predetermined time, causing the second detector to fail in transmitting the signal in due time, the synchronism failure detector will continue counting the time, by which the synchronism failure signal is sent out through line 35, making alarm for it, or otherwise, a signal, effecting to stop the rotary body.

The tolerance $\Delta F$ is so small that the value thereof can be put under 1/1000 of the standard or reference frequency $F_1$. Therefore the rotary body becomes possible to rotate at the speed corresponding to the frequency $F_1 + \Delta F$, regardless of fluctuation of air pressure applied to the driving turbine or of the mechanical load.

In general, the rotary body 2 is started by a compressed air jet applied to the turbine of the body and speed of the body is accelerated until the speed is to synchronize with the predetermined constant speed. The synchronization must be carried out quickly and the synchronous speed must be kept constant. In the further embodiment of the invention shown in FIG. 4 the rotary body is brought to synchronize quickly with the speed corresponding to the standard frequency and to effectively rotate at the constant speed through the feed back control of the pressure of the driving air in order to quicken the shole cycle of self-regulation. In FIG. 4, corresponding elements bear number larger by "40" than those in FIG. 1.

At the beginning, the turbine wheel of the rotary body 2 starts revolution by propelling the turbine blade of the rotary body from air jet (not shown), and, thereby, at time $t_0$ (FIG. 5) attains its speed corresponding to the frequency $F_3$. At the time of $t_0$ when the rotary body is controlled, the switches 47 and 52 are placed at the position shown in FIG. 5. The frequency $F_1$ from the standard input signal 3 and the frequency $F_3$, frequency lower than that of $F_1$, are compared by a comparator 54 during the period from time $t_0$ to time $t_1$ and a deviation signal based on the comparison of the comparator is transmitted to the operating unit of a valve 57. The valve 57 is driven by a motor and the like and adjusts amount of air jet from a driving source (not shown) i.e. a compressed air source, to propel the turbine blade of the rotary body and is shifted toward its opening or closing direction depending upon the direction of rotation of the motor.

In the embodiment shown in FIG. 5, said deviation signal serves to increase the air supply to the rotary body, increasing the speed of the latter until the time of $t_2$. The synchronism detector 59, includes a circuit (not shown) which functions so as to change over the switches 47 and 52 to the position opposite to those shown in the drawing, after elapse of the predetermined time. This changeover condition is kept through while the synchronization is being detected. As the result, the basic signal frequency $F_1$ from the input terminal 3 is sent to an amplifier 48, the output from which is sent to the rotary body 2 through the line 49. At the time of $t_2$ the frequency $F_3$ from the rotary body coincides with the frequency $F_1$, and the coincidence is detected by the detector 59 through a current sensing coupler 58, resulting in the stop of the motor in the valve mechanism 57 and leaving the valve open by thus controlled value. The cycle of controlling the speed of the rotary body is hereby completed. In case when the said synchronization failed to complete in one cycle, the operation is repeated automatically. If the system fails to complete the synchronus control operation during the period $t_1$ to $t_3$, the synchronism detector does not issue the synchronizing signal; as the result, the synchronism-failure detector 60 sends out the necessary alarm signal.

In the course of said control cycle, the speed of the rotary body is increased by opening the valve 57 by means of its valve motor. However, there may be rare cases in which at the time of $t_2$, the synchronism detector 59 fails to issue the synchronizing signal in spite of the instantaneous coincidence of the two signals. In this invention, however, the valve 57 provides its upper opening limit in its construction. The valve motor is so arranged that, if the valve opening reaches its upper limit, the motor runs in reverse direction to close the valve to the predetermined lower opening limit, in order to avoid an excess speed of the rotary body beyond the synchronizing speed corresponding to the reference frequency signal $F_1$. As the result, the revolution of the rotary body slows down gradually, controllingly the speed so as to make its speed signal $F_3$ meet the value of the basic standard speed signal $F_1$ approaching the next opportunity of synchronism. The synchronism detector 59 has a circuit which functions to issue the synchronism failure signal during a predetermined period when the synchronization is broken, and then changes over the switches 47 and 54 to the positions shown in FIG. 4 respectively.

When, by some cause, the synchronization gets broken, the switch 47 is opened and the switch 54 is closed during a short time. The signal $F_1$ is compared with the signal $F_3$ by the comparator 54, and by the result of the comparison, the deviation determines the direction of the motion of the valve motor, thus pulling the system in the cycle of control as mentioned above. During the synchronizing operation, if the amplified output of the basic standard signal $F_1$ has a sufficient power, the rotary body may be driven only by said amplified signal power of the frequency $F_1$, then the rotary body will continue running at the standard speed, synchronizing with the signal $F_1$. Said synchronization will not be broken unless some special foreign disturbance break it.

When the synchronization is broken within the allowable tolerance, the rotary body shows a change in its impedance, and in the current running therein. The current is soon detected through the coupler 58 by the detector 59. Then a circuit (not shown) for producing a signal during a predetermined period immediately acts to operate the comparator 54, to thereby resume the revolution of the rotary body to the original state through the motor valve by means of the actuation of the comparator. Such quick response of the system will prevent twist irregularity as it does not cause the time delay in the restoration of speed, coherent to the synchronism with the standard speed signal.

We claim:
1. A method of controlling the speed of a rotary body rotatable by a mechanical drive, the speed of which is effected to maintain a present number of revolutions by a variable second electric signal which can coincide with a first electric signal corresponding to the present number of revolutions, said method comprising the steps of:
making a comparison of the first signal with a third signal generated from the rotary body, in proportion to the revolution speed of the rotary body, when the number of revolutions of the rotary body deviates from the number of revolutions corresponding to the second signal, sweeping the second signal in accordance with the output voltage of said comparison toward the third signal until coincidence therewith, when deviation based on said comparison lies within a tolerance, detecting the coincidence of the second signal with the third signal, sweeping the second signal in accordance with the output voltage of said detection toward the first signal until coincidence therewith, and maintaining coincidence of the second signal with the first signal.

2. An apparatus for controlling the speed of a mechanically driven rotary body, said body being the rotor of an electromagnetic measuring and control drive controllable as a function of the magnitude and the direction of the difference between the actual signal and the desired signal of the rotary body, said apparatus including:

sweep oscillator means for providing a variable second signal $F_2$ which is synchronized with a first set desired signal $F_1$ in normal condition, capable of being fed to the rotary body, coincidence detector means for detecting the coincidence of the second signal $F_2$ with an actual thrd signal $F_3$ generated from said rotary body in proportion to the revolution speed of said rotary body, comparator means for comparing the first signal $F_1$ with the actual third signal $F_3$, sweep-voltage controller means for determining the direction and amplitude of the voltage of the sweep oscillator means, said controller means being connected to the comparator means and to the coincidence detector means, and phase comparator means for comparing the first signal $F_1$ with the second signal $F_2$, in which when the third signal $F_3$ is not synchronized with the second signal $F_2$, said oscillator means being adapted to sweep the second signal $F_2$ till a coincidence exists with the third signal $F_3$ through the sweep-voltage controller means in response to the output voltage of the comparator means, based on the deviation between said first and third signals on occurrence of a difference lying within the predetermined tolerance range, after which said sweep oscillator means sweeps the second signal $F_2$ till coincidence exists with the first signal $F_1$ in response to the output voltage of the coincidence detector means, and thereafter the second signal $F_2$ being fixed to the first signal $F_1$ by the phase comparator means and the sweep oscillator means, so that the speed of rotation of the rotary body is locked constantly to the first desired signal $F_1$.

3. An apparatus as defined in claim 2, in which said coincidence detector means is disposed between the sweep oscillator means and the rotary body, and being adapted to detect the coincidence of the second signal with respect to the third signal, the output of which is applied to said sweep-voltage controller means.

4. An apparatus as defined in claim 2, in which said phase comparator means and said sweep oscillator means defines phase locked loop circuit.

5. An apparatus as defined in claim 4, being further defined by:

second coincidence detector means for detecting the coincidence of the first signal with the second signal, whereby said phase locked loop circuit closes when the first and second signals coincide.

6. An apparatus as defined in claim 2, wherein said first, second and third signals are frequency signals.

* * * * *